United States Patent [19]

Fortin et al.

[11] Patent Number: 4,861,388
[45] Date of Patent: Aug. 29, 1989

[54] METHOD FOR CONTACT CONDUCTOR FOR ELECTRIC VEHICLES

[75] Inventors: Paul-Emile Fortin; Willard M. Gallerneault, both of Kingston, Canada

[73] Assignee: Alcan International Limited, Montreal, Canada

[21] Appl. No.: 86,521

[22] Filed: Aug. 18, 1987

[30] Foreign Application Priority Data

Aug. 20, 1986 [CA] Canada .................................. 516434
May 20, 1987 [CA] Canada .................................. 537462

[51] Int. Cl.⁴ .............................................. C22F 1/04
[52] U.S. Cl. .................................. 148/2; 148/12.7 A; 148/415; 148/440
[58] Field of Search ................... 148/12.7 A, 415, 437, 148/440, 2; 420/534, 535, 544

[56] References Cited

U.S. PATENT DOCUMENTS

| | | | |
|---|---|---|---|
| 1,848,816 | 3/1932 | Archer | 420/534 |
| 3,337,377 | 8/1967 | Bonmarin | 148/415 |
| 3,613,767 | 10/1971 | Cofer | 164/476 |
| 4,151,896 | 5/1979 | Nicoud | 148/2 |

FOREIGN PATENT DOCUMENTS

| | | |
|---|---|---|
| 3437871 | 4/1985 | Fed. Rep. of Germany . |
| 0137811 | 12/1978 | Japan .................................. 148/2 |
| 2143190A | 2/1985 | United Kingdom . |

*Primary Examiner*—R. Dean
*Attorney, Agent, or Firm*—Cooper & Dunham

[57] ABSTRACT

A contact conductor for electric vehicles is produced from an aluminum alloy containing an excess of silicon. The alloy comprises 0.1–1% by weight magnesium, 1–7% by weight silicon and the balance being aluminum and incidental impurities. The conductor is produced by the steps of: (1) casting the alloy into a continuous bar, (2) hot rolling to rod without intermediate cooling, (3) quenching the hot rolled rod, (4) cold deforming the quenched rod and (5) subjecting the cold deformed rod to artificial aging.

6 Claims, 2 Drawing Sheets

METHOD FOR CONTACT CONDUCTOR FOR ELECTRIC VEHICLES

This invention relates to contact conductors used to provide electrical power to vehicles, such as electric trains, trams, trolley buses and the like.

In the past, hard drawn copper or copper alloy wires have been used for vehicle contact conductors because of the high electrical conductivity and corrosion resistance of copper. Because of the high price of copper, there has been a need for a satisfactory contact wire made from other metals, such as aluminum.

While aluminum has good electrical conductivity, its strength and wear resistance are relatively low. To solve this problem, particularly for overhead contact wires, it has been suggested to use a steel wire sheathed in aluminum so that the steel wire can provide the necessary strength while the aluminum sheath provides good electrical conductivity. U.K. Patent No. 2,143,190 published Feb. 6, 1985, describes such a composite conductor having a steel core completely enclosed within an aluminum alloy outer covering, with at least the contact surface of the conductor being formed of a wear resistant aluminum alloy containing silicon, nickel and cerium for wear resistance.

German OS NO. 3,437,871, published Apr. 25, 1985, describes a contact rail for providing power to an electric vehicle in which the contact rail is made of an aluminum-silicon alloy typically containing about 10 to 13.5% by weight of silicon. The alloy also preferably contains 0.2 to 1% magnesium.

It is the object of the present invention to provide an improved contact conductor, particularly an overhead contact wire, having sufficient tensile strength that it can be made entirely of an aluminum alloy without the need of a steel reinforcing wire.

SUMMARY OF THE INVENTION

According to the present invention it has been discovered that a contact conductor for providing power to electric vehicles can be formed entirely from a single aluminum alloy containing an excess of silicon. This alloy contains 0.2–1% by weight magnesium and 1–7% by weight silicon, with the balance being aluminum and incidental impurities. The silicon content is preferably kept within the range of 1.5 to 5%.

The excess silicon is calculated by subtracting from the total silicon content, the silicon needed to form $Mg_2Si$ in the stoichiometric ratio of 1.73 Mg to 1 Si and the silicon associated with the Fe constituent (Al Fe Si). The silicon content in the latter phase is not constant but varies around the ratio 3 Fe to 1 Si. Thus excess silicon can be calculated as:

$$\text{Total \% Si} - \left( \frac{\% \text{Mg}}{1.73} + \frac{\% \text{Fe}}{3} \right)$$

To be useful for the purposes of the present invention, the alloy should have an excess silicon content of at least 0.6%.

Silicon has a limited solubility in aluminum and the excess silicon is mostly present as finely distributed metal silicon particles which are harder than aluminum and provide excellent wear resistance, as evidenced by casting alloys used for engine blocks and bearings. Electrical conductivity decreases and brittleness increases with increasing silicon content.

To be useful as an overhead contact conductor, the alloy wire of the invention must not only have good electrical conductivity and good wear resistance, but also have good tensile properties. These tensile properties are enhanced by the processing steps used, which include: (1) casting the alloy into a continuous bar, (2) hot rolling the bar to rod without intermediate cooling, (3) quenching the hot rolled rod, (4) cold deforming the quenched rod and (5) subjecting the cold deformed rod to artificial aging.

According to a preferred embodiment, the alloy is cast in a continuous casting and rolling machine and hot rolled immediately to form a large rod, with an intermediate, continuous re-heat, if necessary to attain a temperature of 500° C. or more for hot rolling. The hot rolling is carried out without delay and the rod is quenched with water or a water-based emulsion at the mill exit. The size of the rolled bar is generally in the range of 13 to 25 mm. This hot rolled bar is subsequently cold rolled or drawn, or both, to introduce some cold deformation into the metal. Grooves are also usually rolled into the bar section during the above operation for subsequent suspension and splicing of the installed contact wire.

The formation of the grooves has proven to be somewhat of a problem in that forming the grooves by drawing sometimes caused quite severe, very localized deformation in the grooves, resulting in cracking It was necessary that the material be given an intermediate anneal and, in doing so, the tensile strength of the wire at its final size were reduced markedly. According to a particularly preferred embodiment of the present invention, the amount of cold deformation in the grooved area can be minimized by pre-forming the grooves roughly during the hot rolling operation. This can be done by modifying certain of the rolls used in the hot rolling mill.

The wire preformed in this manner can then be subsequently drawn to final size and age hardened to the desired properties. It has been found that when the grooves are formed during hot rolling instead of by drawing after annealing, the full T4 tensile properties are retained in the quenched rod instead of the fully soft condition of the annealed temper.

The final size and configuration of the contact wire varies with the requirement of each installation. However, common sizes are generally of a cross sectional area of about 125 to 200 mm².

Once the wire has been formed into its desired shape, it is submitted to an artificial aging to optimize its strength and conductive properties. Depending on the alloy composition and the properties required, the aging treatment may consist of heating up to 130° to 180° C. and holding at that temperature for between 1 and 24 hours. A typical aging treatment is for about 5 hours at 155° C.

The invention will now be described, by way of example, with reference to the accompanying drawings, in which.

Figure 2:
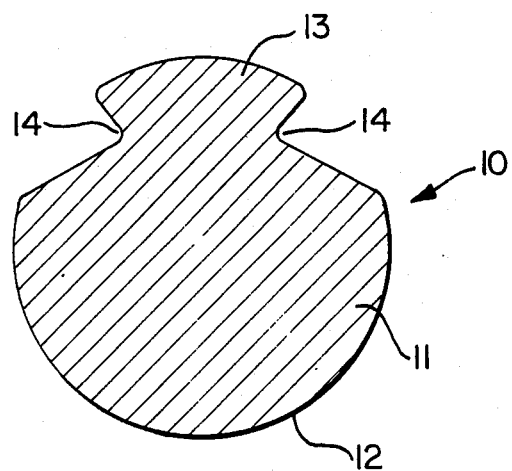
FIG. 2 is a section through one form of conductor according to the invention.

A typical overhead contact conductor 10 according to this invention is shown in FIG. 2. This includes a lower body portion 11 having a contact surface 12 which is touched by a carbon shoe or the like. The upper part 13 is shaped by forming two opposed grooves 14 rolled in it so that it can be gripped by hangers to suspend it.

Figure 3:
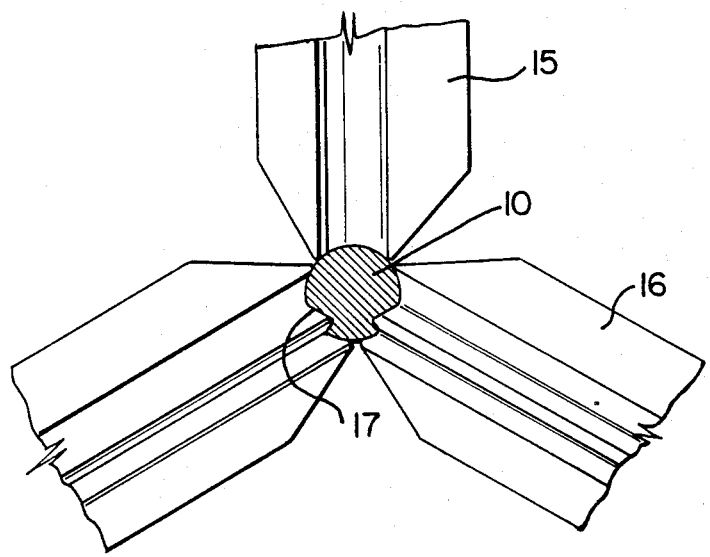
FIG. 3 is a partial sectional view showing portions of hot forming rolls.

The grooves 14 can conveniently be formed during a hot rolling operation, e.g. in a Properzi mill. A stand of a rolling mill is shown in FIG. 3 designed to form the grooves 14. Three rolls are used at each stand and, for forming the pair of grooves 14, one roll 15 is left in its standard form while two rolls 16 have modified contact surfaces 17 with a contact profile adapted to form the grooves 14.

EXAMPLES 1

Three aluminum alloys were tested based on alloy AA 6201. Two of these alloys contained silicon within the normal range of 0.5-0.9%, while the third alloy contained 1.96% silicon. The alloy compositions and tensile properties are given in Table 1 below:

TABLE 1

| Alloy No. | Composition in Weight Percent | | | | | | | |
|---|---|---|---|---|---|---|---|---|
| | Cu | Fe | Mg | Mn | Si | Ti | B | Ga |
| 1 | .016 | .24 | .67 | .002 | .59 | .017 | .006 | .010 |
| 2 | .027 | .22 | .67 | .002 | .84 | .014 | .006 | .010 |
| 3 | .027 | .21 | .68 | .002 | 1.96 | .009 | .005 | .012 |

The above were cast in a continuous casting machine, immediately hot rolled at 510° C. to form rods 19.3 mm in diameter and water quenched. The rods were drawn to a diameter of 15.8 mm and the drawn rods were aged under varying conditions. The strength and conductivity properties for the different aging conditions are given in Table 2 below:

EXAMPLE 2

Figure 1:
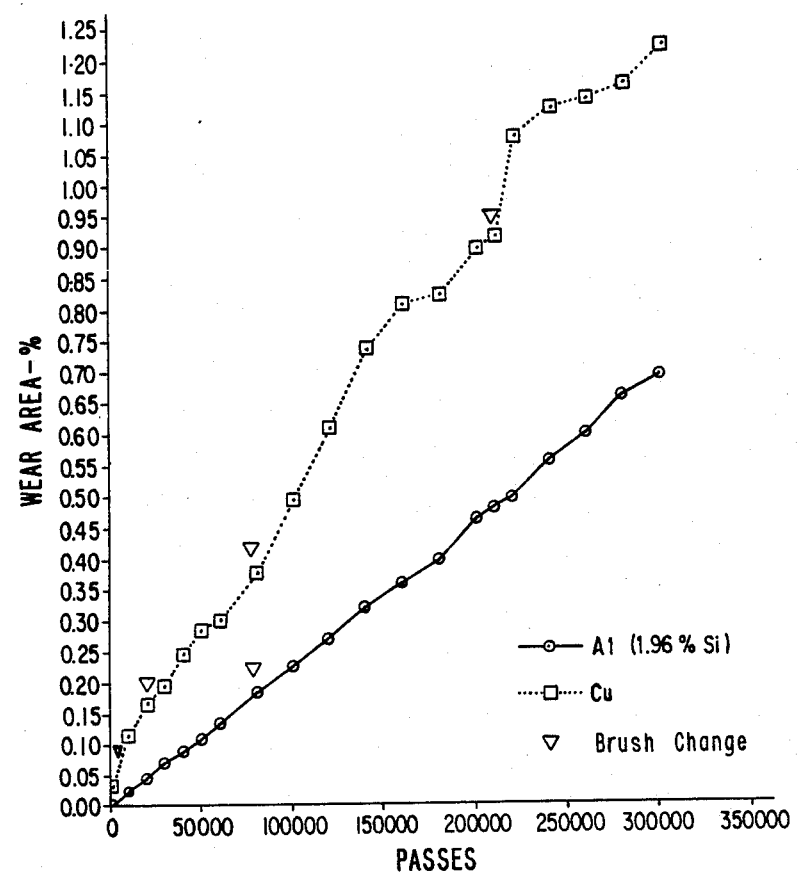
FIG. 1 is a plot showing wear characteristics of different conductors.

Wear tests were conducted comparing a wire made of Alloy No. 3 of Example 1 with a copper wire. For these tests, the wire was placed horizontally on a 7.62 m diameter wheel. An electrical contact was provided with a copper-impregnated carbon brush. The current was 60 amps and the wheel was turned at 55 rpm. The reduction of the wire cross-section was measured at regular intervals and plotted against the number of passes of the brush to obtain the plot of FIG. 1.

We claim:

1. A process for producing a contact conductor of improved physical strength from a wear-resistant aluminum alloy comprising 0.2-1% by weight magnesium, 1-7% by weight silicon and the balance being aluminum and incidental impurities,
    said process comprising the steps of: (1) casting said alloy into a continuous bar, (2) hot rolling to form rod without intermediate cooling, (3) quenching the hot rolled rod, (4) cold deforming the quenched rod and (5) subjecting the cold deformed rod to artificial aging.

2. A process according to claim 1 wherein a bar temperature of at least 500° C. is maintained for hot rolling.

3. A process according to claim 1 wherein the quench is conducted with water or a water-based emulsion.

4. A process according to claim 1 wherein the cold deforming comprises cold rolling or drawing or both cold rolling and drawing.

5. A process according to claim 1 wherein the artificial aging is carried out by heating to a temperature of 130° to 180° C. for about 1 to 24 hours.

6. A process according to claim 1 wherein during a stage in hot rolling, a pair of opposed grooves are formed longitudinally in the rod by rolling to provide a grip for hangers.

* * * * *

TABLE 2

Strength and Conductivity Properties of 5/8" Rod (15.8 mm)

| Alloy No. | Si % | Condition (h @ °C.) | Tensile Properties | | | | | Elec. Cond. % IACS |
|---|---|---|---|---|---|---|---|---|
| | | | UTS ksi | UTS MPa | 0.2% YS ksi | 0.2% YS MPa | Elong. %/250 mm | |
| 1 | 0.59 | As drawn | 39.3 | 271 | 38.9 | 268 | 4.8 | — |
| | | 4 h @ 155 | 44.3 | 306 | 43.0 | 296 | 7.6 | — |
| | | 6 h @ 155 | 43.0 | 296 | 41.9 | 289 | 6.7 | — |
| | | 4 h @ 165 | 40.8 | 281 | 39.6 | 273 | 6.4 | — |
| | | 6 h @ 165 | 40.0 | 275 | 38.5 | 266 | 7.3 | — |
| 2 | 0.84 | As drawn | 42.5 | 293 | 41.9 | 289 | 5.2 | 49.66 |
| | | 4 h @ 155 | 45.8 | 316 | 44.7 | 308 | 9.2 | — |
| | | 6 h @ 155 | 44.6 | 307 | 43.6 | 301 | 7.9 | 54.57 |
| | | 4 h @ 165 | 42.8 | 295 | 41.7 | 287 | 7.3 | — |
| | | 6 h @ 165 | 41.8 | 288 | 40.6 | 280 | 6.7 | 55.79 |
| 3 | 1.96 | As drawn | 43.1 | 297 | 42.1 | 290 | 5.6 | — |
| | | 4 h @ 155 | 44.2 | 305 | 42.6 | 294 | 8.6 | — |
| | | 6 h @ 155 | 42.8 | 295 | 41.5 | 286 | 7.8 | 53.64 |
| | | 4 h @ 165 | 41.6 | 287 | 39.9 | 275 | 6.3 | — |
| | | 6 h @ 165 | 40.6 | 280 | 38.5 | 266 | 7.6 | 55.33 |